INVENTOR.
MICHAEL A. ZINIUK

United States Patent Office 3,488,584
Patented Jan. 6, 1970

3,488,584
METHOD AND APPARATUS FOR RESISTIVITY MEASUREMENT OF FLOWING HIGH TEMPERATURE LIQUID METALS
Michael A. Ziniuk, Melvindale, Mich., assignor to Atomic Power Development Associates, Inc., Detroit, Mich., a corporation of New York
Filed May 4, 1965, Ser. No. 453,074
Int. Cl. G01r 27/02, 11/44
U.S. Cl. 324—65    7 Claims

ABSTRACT OF THE DISCLOSURE

A method and apparatus relating to a high-frequency bridge including a resistance sensing probe disposed in the flowing liquid and a second probe of substantially similar construction disposed in an enclosed reference sample of high purity, like fluid in thermal contact with the flowing liquid to provide temperature compensation, a slide wire to balance the bridge, high-frequency alternating current excitation of the order of about 10,000 cycles per second to establish localized eddy currents in the liquid and thereby achieve electrical isolation of the probes, and signal processing means to convert the alternating current bridge output signal for operation of a recorder.

---

This invention has to do with method and apparatus for measuring electrical resistivity of liquid metals and more particularly to liquid metals which are subjected to high temperatures.

The apparatus according to this invention is particularly adapted, among other possible uses, for use in space applications or for sensing the presence of gas bubbles, oxides, or other contaminants in nuclear reactor coolants. That is, the new and improved apparatus of this invention senses the conductivity variations due to the presence or absence of such contaminant material in the liquid metal being tested.

In essence, the present invention contemplates the provision of apparatus for measuring electrical resistivity of liquid metal comprising two thimbles of substantially identical physical dimensions, one being the resistivity sensor and the other being the thermal compensator. The resistivity sensor thimble is immersed in the monitored or liquid metal to be tested, while the other thimble is immersed in a reference liquid, preferably the same kind of liquid metal as that being tested, but of a known purity and preferably of relatively high purity, the reference liquid is contained in a containment which is also immersed in the monitored liquid metal. Preferably, the containment is a bellows-like structure to accommodate volumetric changes caused by temperature variations, and has a thin-wall to enable good heat transfer between the two liquid media. The closed ends of the thimbles are electrically interconnected by a "slidewire" for forming a bridge circiut, and preferably high frequency constant voltage power is supplied for bridge excitation, to obtain electrical isolation of the thimbles through skin effect. The resistivity of the monitored liquid metal is sensed and metered by its shunting influence upon the thimble resistance, and thermally caused resistivity changes of the liquid metal and mechanical structure are compensated for by the reference sample of liquid metal and the structural symmetry.

A feature of this invention resides in the provision of new and improved apparatus for measuring electrical resistivity of liquid metal which is structurally simple and durable, which may operate continuously without special controls or adjustments, and which may be easily readjusted after long periods of operation to return the apparatus to its original high accuracy.

Another feature of this invention is the provision of apparatus for measuring electrical resistivity of liquid metal which is small, compact and light weight.

According to the present invention, as another feature thereof, there is provided apparatus for measuring electrical resistivity of liquid metals which is highly accurate, which has close self-thermal compensation of the order of about 0.2° F., which has a fast response, which does not require a magnetic choke to minimize the effect of bypass currents around outside piping normally required with prior art devices.

Still another feature of this invention resides in the fact that the bridge network configuration of the sensor, its output will be a nonlinear function of the measured resistivity, with compression occurring at the high end of the scale and maximum sensitivity occurring at balance. That is, as the bridge circuit becomes unbalanced, it takes an increasingly greater change in the unbalanced leg to obtain a given bridge output change as the unbalance progresses.

Still another feature of this invention resides in the provision of electrical resistivity measuring apparatus for liquid metals which does not require the use of certain temperature limiting materials which heretofore were thought necessary, such as transformer iron and mica insulation. Accordingly, the present apparatus has a broad operating temperature range which has no known upper limit of operation, but preferably has an operating temperature range up to about 1500° F.

According to the present invention, as still another feature thereof, there is provided a new and improved apparatus for measuring electrical resistivity of liquid metals which incorporates a symmetrical bridge structure so that the circuit stays balanced over a wide temperature range, and with which the resistivity is precisely balanced physically, thermally and electrically, whereby precise accuracy is obtained over a wide temperature operating range.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein.

Figure 1:
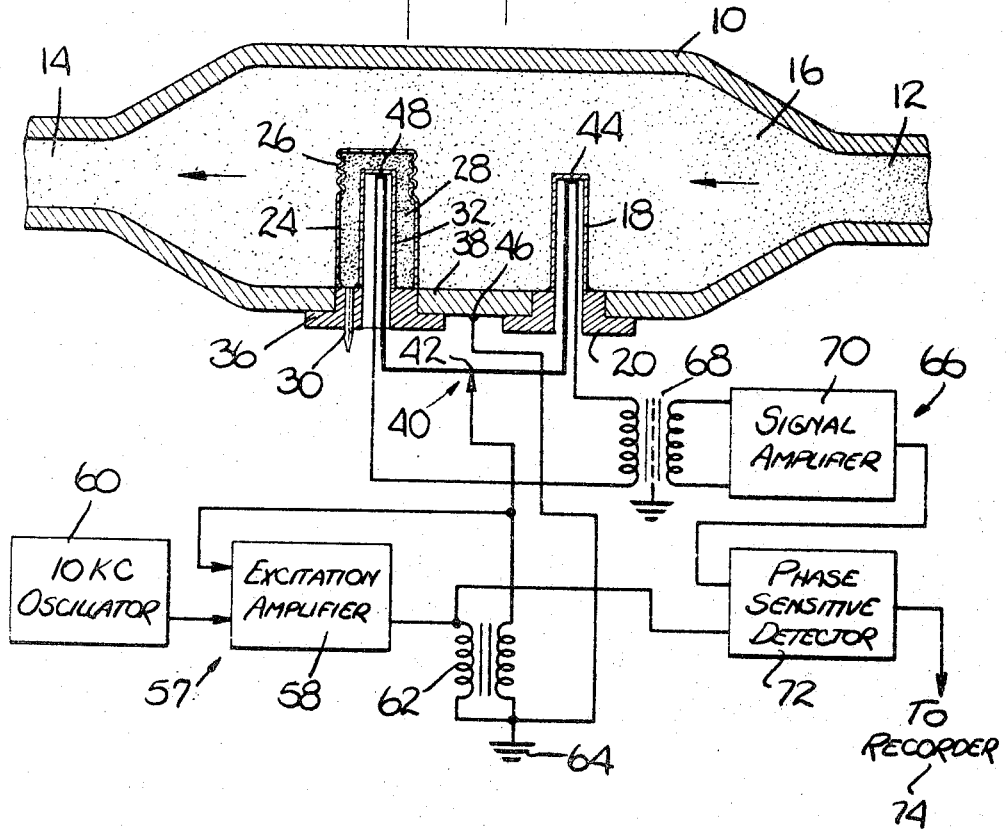
FIG. 1 is a sectional elevation with certain portions in block diagram form of the apparatus according to this invention.

In the illustrated embodiment of the invention, the apparatus for measuring electrical resistivity of liquid metals comprises a pipe 10 having an inlet 12 and an outlet 14 through which passes the monitored or liquid metal 16 to be tested. The illustrated embodiment of the invention is particularly adapted to test the liquid metal coolant of a nuclear reactor, the metal being exemplified by liquid sodium.

The first probe or sensor thimble 18 is immersed in the monitored sodium 16 and functions as the resistivity sensor. Preferably this probe or thimble is made of metal having high resistance and a low thermal coefficient of resistivity, such as Inconel or stanless steel, for example. The thimble 18 is held in position in pipe 10 by means of thimble flange 20 provided for the purpose. Preferably, the surface of the thimble exposed to the sodium is etched to insure good surface wetting.

An expansible containment 24 is also immersed in the monitored sodium 16, as best seen in FIG. 1. The containment 24 contains a reference sample of sodium 28 of known purity, and preferably of high purity, a pinch tube 30 being provided for purposes of filling the containment. Preferably, it has a thin wall construction and is a bellows-like structure as indicated at 26, the bellows-like configuration being provided to allow expansion of the sodium 28 caused by temperature variations, and the thin-wall provision enabling good heat transfer between the two sodium media. A high thermal conductivity material is used for the containment, such as tantalum, for example.

A second probe or thimble 32 is immersed in the high purity sodium 28. This thimble is of identical dimensions and material as the first thimble 18. Also, the thimble surface exposed to the sodium is etched to insure good surface wetting. Actually, the second thimble 32 is maintained at substantially the same temperature as the sensor thimble 18 because of the thin-wall containment 24 and the fact that it is immersed in the monitored sodium 16. In this manner the two thimbles are subjected to the same conditions except that one thimble is in sodium of known purity and the other thimble is in contaminated sodium so that the difference in electrical resistivity is due to the difference in contamination. Actually a small degree of impurity can be tolerated in the reference sample, if the bridge circuit is balanced accordingly. During normal operation of the apparatus the reference sodium tends to gradually become contaminated so that periodic rebalancing of the bridge circuit is desirable to maintain high accuracy. The probe 32 is held in position with respect to the pipe 10 by means of thimble flange 36. It is noted that the pipe wall 38 between the thimble flanges 36 and 20 is of low electrical resistance.

The closed ends of the thimbles 18 and 32 are electrically interconnected by a "slide wire" 40 of the same material as used for the thimbles, forming a bridge circuit.

Since the thimbles are physically close together and electrically bridged by a low resistance pipe wall 38, the need for a magnetic choke to minimize effects of by-pass currents around the outside piping is unnecessary.

Figure 2:
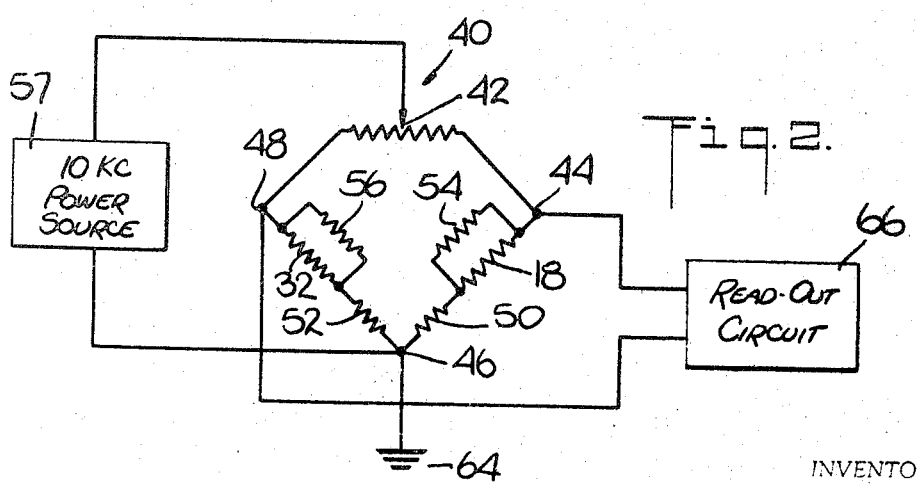
FIG. 2 is a circuit diagram of the apparatus of FIG. 1.

As best seen in FIG. 2, a bridge network is formed comprising first 42, second 44, third 46, and fourth 48 bridge terminals. The sensor thimble 18 and the compensator thimble 32 form two arms of the bridge circuit, that is, the body of the sensor thimble 18 acts as the resistance of one leg and the body of the temperature compensator thimble 32 acts as the resistance of the adjacent arm of the bridge circuit. Also, interposed between the terminals 44 and 46 (FIG. 2) is the resistance 50 of the piping between the flange 20 and the connection 46 shown in FIG. 1. Interposed between the terminals 46 and 48 (FIG. 2) is the resistance 52 corresponding to the piping between the flange 36 and the terminal 46 shown in FIG. 1.

Referring to FIG. 2, the monitored liquid metal 16 and the reference liquid metal 28 comprise resistances 54 and 56, respectively, which shunt their respective sensing probes or thimbles 18 and 32. A change of resistivity of the liquid metal would be sensed by a change of total resistance of the corresponding leg of the bridge circuit. Referring to FIG. 1, excitation to the bridge circuit is provided by a feedback-stabilized power amplifier 58 driven by a 10,000 c.p.s. oscillator 60 through a magnetic core transformer 62 having a ground terminal 64. High frequency power is used to obtain electrical isolation of the thimbles by means of skin effect. The sodium current path is not directly between the thimble ends as would be the case with direct current, and hence, short circuiting of the bridge is avoided. In fusion or penetrating of the current into the sodium is about 0.080 inch which is sufficient for adequately sensing the resistivity. This power source is indicated generally at 57 and is connected across the terminals 42 and 46 (FIG. 2).

As best seen in FIG. 2, a readout circuit, indicated generally at 66, is connected between terminals 44 and 48. The readout circuit 66 comprises a Faraday shield 68 (FIG. 1), a signal amplifier 70 and a phase sensitive detector 72 leading to a suitable recorder 74 of known construction. The bridge network output is a nonlinear function of the measured resistivity, with compression appearing at the high end of the scale and maximum sensitivity occurring at balance. It will be appreciated that both of these characteristics are desirable. Thermally-caused resistivity changes of the sodium are compensated for by the reference sample sodium and structural symmetry. Before calibration, the bridge is balanced under known conditions of sodium purity (or impurity) by adjustment of the slide-wire 40. Calibration runs are employed to determine the scale or conversion factor for absolute resistivity in terms of output voltage obtained from the bridge.

It will thus be seen that the present invention does indeed provide an improved apparatus for measuring electrical resistivity of liquid metal.

What is claimed and desired to be secured by Letters Patent is:

1. Apparatus for measuring electrical resistivity of liquid metal comprising two substantially identical thimbles, one being positionable in the liquid metal to be tested, a containment, the other of said thimbles being positionable in a reference sample of like liquid metal contained in the containment, said containment being immersed in said liquid metal to be tested in closely spaced relationship with respect to said first thimble, said containment having thin walls and a bellows-like configuration, means for passing an electrical current of high frequency through said thimbles and only through the liquid metal adjacent thereto respectively, and means for comparing the resistivity of one thimble with respect to the other thimble.

2. Apparatus for measuring electrical resistivity of liquid metal comprising two substantially identical thimbles, one being positionable in the liquid metal to be tested, a containment, the other of said thimbles being positionable in a reference sample of like liquid metal contained in the containment, said containment being immersible in said liquid metal to be tested in closely spaced relationship with respect to said first thimble, said containment having thin walls and a bellows-like configuration, said thimbles being of material having high electrical resistance and a low thermal coefficient of resistivity, means for electrically interconnecting said thimbles, means for passing an electrical current having a high frequency through said thimbles and only through the liquid metal adjacent thereto respectively, and electrical bridge circuit means for comparing the resistivity of said thimbles.

3. Apparatus for measuring resistivity of liquid metal comprising two substantially identical thimbles, one being positionable in the liquid metal to be tested, a containment, the other of said thimbles being positionable in a reference sample of like liquid metal contained in the containment, said containment being immersed in said liquid metal to be tested in closely spaced relationship with respect to said first thimble, said containment having thin walls and a bellows-like configuration, said thimbles being of material having high resistance and a low thermal coefficient of resistivity, said thimbles being electrically interconnected by a slide wire forming two adjacent arms of a bridge circuit, power means having a frequency of about 10,000 cycles per second for excitation of said bridge circuit thereby passing an electrical current through said thimbles and through the liquid metal adjacent thereto respectively, and read-out means for said bridge circuit.

4. Apparatus for measuring electrical resistivity of liquid metal comprising a pipe having an inlet and an outlet for the flow of monitored liquid to be tested, a resistivity sensor thimble protruding inwardly into said pipe, a container protruding inwardly into said pipe in closely spaced relationship with respect to said thimble, said containment being adapted to contain a reference sample of known purity of like liquid metal, a thermal compensator thimble being disposed in said reference sample of liquid metal contained within said containment, said thimbles being made of substantially identical material and physical structure and being made of material having high resistance and a low thermal coefficient of resistivity, the pipe wall disposed between said thimbles being of low resistance, said thimbles being electrically interconnected by a slide-wire forming two adjacent arms of a bridge circuit, said bridge circuit comprising first, second, third and fourth bridge terminals, the sensor thimble acting as a resistance between the second and third terminals, the compensator thimble acting as a resistance between the third and fourth terminals, the first terminal being the contact point of the slide-wire, the third terminal being a contact point positioned on the pipe interconnecting the two thimbles, the reference liquid metal and the monitored liquid being resistances which shunt their respective thimbles, power means for excitation of said bridge circuit being provided at constant voltage and high-frequency connected between the first and third terminals, and a readout circuit being connected between the second and fourth terminals, said power means comprising a feed-back stabilized power amplifier driven by a high frequency oscillator, and said read-out circuit comprising a Faraday shield, a signal amplifier, a phase sensitive detector and a recorder.

5. A method for measuring electrical resistivity of liquid metal comprising causing said liquid metal to flow past a testing position having a bridge circuit including two substantially identical thimbles, one being immersed in said liquid and the other being disposed in a reference sample contained in a container which is immersed in said liquid metal, applying high-frequency power of the order of about 10,000 cycles per second to said bridge circuit, passing an electrical current through said thimbles and through the liquid metal adjacent thereto to a depth of about 0.080 inch respectively, comparing and metering the resistivity of the liquid metal and the reference sample by their shunting influence upon the resistance of their thimbles respectively.

6. A method of measuring electrical resistivity of liquid metal comprising causing monitored liquid metal to flow past a testing position, immersing a resistivity sensor probe in said monitored liquid metal, immersing in said monitored liquid metal a containment containing a reference sample of known purity of like liquid metal and a thermal compensator thimble, electrically joining said thimbles in a bridge circuit, applying high frequency power of the order of about 10,000 cycles per second across one pair of bridge terminals, sensing and metering the resistivity of the monitored liquid metal across the second pair of terminals in said bridge circuit.

7. A method for measuring electrical resistivity of liquid metal comprising the steps of passing monitored sodium through a test station, inserting a sensor thimble in said monitored sodium, inserting a containment containing a bath of reference sodium and a reference thimble in said monitored sodium adjacent said sensor thimble, electrically joining said thimbles to form a bridge circuit, applying a source of power having substantially constant voltage and 10,000 c.p.s. across one pair of terminals of said bridge circuit, sensing and metering the resistivity of the monitored liquid metal sodium by its shunting influence upon the thimble resistance.

References Cited

UNITED STATES PATENTS

| | | | |
|---|---|---|---|
| 1,304,208 | 5/1919 | Shakespear | 324—65 XR |
| 1,912,188 | 5/1933 | Gann | 324—30 |
| 2,083,074 | 6/1937 | Maass | 324—30 |
| 2,112,750 | 3/1938 | Price | 73—204 XR |
| 3,183,715 | 5/1965 | Holmes | 73—304 |

FOREIGN PATENTS

| | | |
|---|---|---|
| 1,288,845 | 12/1962 | France. |

RUDOLPH V. ROLINEC, Primary Examiner

E. E. KUBASIEWICZ, Assistant Examiner

U.S. Cl. X.R.

324—30